G. H. DAY.
OPHTHALMIC MOUNTING.
APPLICATION FILED DEC. 26, 1917.
1,306,527.
Patented June 10, 1919.
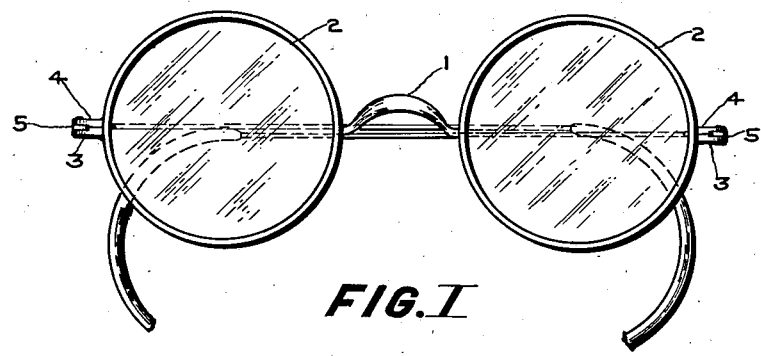
FIG. I
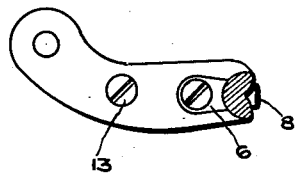
FIG. II
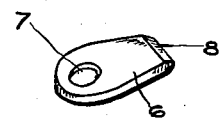
FIG. III
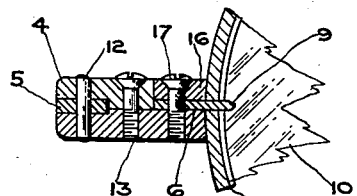
FIG. IV
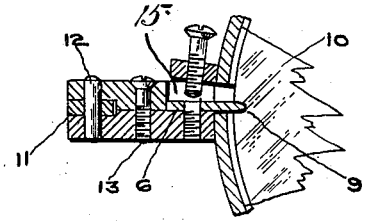
FIG. V
INVENTOR
GEORGE H. DAY
BY
H. H. Styll & H. K. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,306,527.  Specification of Letters Patent.  Patented June 10, 1919.

Application filed December 26, 1917.  Serial No. 208,937.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to an improved device for properly retaining the lens within the mounting.

A further object of the present invention is the provision of a novel and improved construction especially adapted for use in connection with cylindrical lenses mounted within round eye frames, which will prevent the lens from moving from the proper axis.

Another object of the present invention is the provision of a neat, inexpensive and efficient device which may be used either with frames already in existence or may be applied to new or especially constructed frames and which will prove equally efficient in either event.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting constructed in accordance with and embodying my improvements.

Fig. II represents a plan view of the end piece enlarged with frame shown in section.

Fig. III represents a detail view of one of my locking devices.

Fig. IV represents a vertical sectional view of the end piece and associated parts.

Fig. V represents a similar sectional view showing the frames opened.

In the drawings, the numeral 1 designates a spectacle bridge connecting a pair of round eye lens frames 2 provided with the end piece sections 3 and 4, between which is pivoted the butt 5 of a temple for retaining the frames in position on the face.

It will be noted that I have here illustrated a round eye form of spectacle, the particular spectacle illustrated being what is commonly known as the military spectacle, in that it is a particular style of spectacle which has been designed for the use of our soldiers in the present war, possessing the advantage of being an extremely strong and durable frame and of being round so that a round eye lens may be fitted therein. The purpose of providing the frame for round eyes is so that lenses may be ground up in advance with standard sphero cylinder prescription, and it is then merely necessary to mount the lens in the frame with the axis of the cylinder properly positioned according to the requirements of the particular patient. It will thus be seen that it is very desirable in the use to which these spectacles are liable to be subjected that some means be provided to prevent these round eye sphero cylinder or cylinder lenses from becoming twisted out of proper position in the frame and it is, therefore, the particular purpose of my present invention to provide a novel, ornamental and improved construction which may be readily applied to those spectacles now in use as well as being capable of use in connection with frames particularly constructed for this purpose.

In carrying out this invention my device may if desired assume the form of the plate 6 having a screw receiving aperture 7 at one end and having the preferably beveled portion 8 at the opposite end adapted to fit within the notch 9 formed in the edge of the lens 10. A particularly desirable frame construction for use in connection with this plate is illustrated in detail in Figs. II, IV and V of my patent drawing, from which it will be noted that this frame member has the two end piece members 3 and 4, the said members being recessed at their outer ends as at 11 to receive the temple butt 5, which is pivotally secured in the recess as by the dowel 12, the two halves being here shown as held together by the screw 13, although it will be understood that the parts 3 and 4 could be made in a solid block or integral with a slot formed at 11 to receive the temple butt and a screw passed through the parts on which the temple could be pivoted. A frame of this character presents the appearance of being provided with an ordinary and usual form of end piece, the actual joint in this instance being concealed as the joint is located adjacent the lens frame 14, the portion 4 in Fig. IV being shown as formed with a recess 15 to receive the ear 16, secured to one end of the frame, the ear 16 being drawn toward the parts 3 as by the screw 17.

The advantage of this construction is that by its use an allowance is possible for a variance in the size of the lens to be mounted within the frame or a slight variance in the frame itself, since the member 16 fits down into the side of the recess 15 of the ear 4 and consequently there may be a gap between the parts 3 and 16 without appearing on the outside or forming a dirt catching space.

As a matter of fact, in connection with this improved frame I use my locking device illustrated in detail in Fig. III, this device dropping down into the recess 15 and fitting between the ends of the frame, as illustrated in Fig. IV, the screw 17 passing through the aperture 7, while the engagement of the sides of the wall of the aperture 15 with the member 6 retains it against any twisting movement and its inner end 8 projects inwardly beyond the frame for engagement in the notch 9 of the edge of the lens.

From the foregoing description the construction of my improved device should be readily understood and it will be seen that I have provided a simple but extremely practical and desirable device capable of use either with old frames now in existence or in connection with new especially constructed frames, and which device will serve to satisfactorily and securely engage and retain round eye cylindrical lenses against any twisting or rotative movement in their frames and will consequently permit of the use of interchangeable frames and lenses and at the same time insure the lens when within the frame being in exact proper position to correct the vision of the individual wearer for whom it has been prescribed. It will further be noted that a frame embodying my improvement as just described will satisfactorily stand up under the severe usages of military life and insure proper correction of vision of the wearer and prevent accidental displacement of his lenses.

I claim:

1. The combination with a spectacle frame, having a pair of spaced endpiece members and a temple pivotally connected between said endpiece members, of a plate adapted to be disposed between the endpiece members and being of a length to project beyond the endpiece members, and means whereby said plate may be removed without disturbing the position of the temple.

2. The combination with a spectacle frame having endpieces, of temple members secured between the outer ends of the endpieces, one of said endpieces being formed in sections, a plate adapted to be disposed between one section of the sectional endpiece and the other endpiece, said plate being of a length to project beyond the endpiece members.

3. A device of the class described including a spectacle frame having a pair of endpiece members, a plate disposed between the endpiece members and adapted for engagement with the edge of a lens arranged within the frame, a temple pivotally connected between the outer ends of the endpieces, and means whereby said plate can be removed without disturbing the position of the temple.

In testimony whereof I have affixed my signature, in presence of two witnesses.

GEORGE H. DAY.

Witnesses:
WM. P. CHASE,
WILLIAM B. JONES.